United States Patent
Havemose

(10) Patent No.: US 8,782,670 B2
(45) Date of Patent: *Jul. 15, 2014

(54) SYSTEM AND METHOD FOR APPLICATION ISOLATION

(75) Inventor: Allan Havemose, Arroyo Grande, CA (US)

(73) Assignee: Open Invention Network, LLC, Durham, NC (US)

( * ) Notice: Subject to any disclaimer, the term of this patent is extended or adjusted under 35 U.S.C. 154(b) by 702 days.

This patent is subject to a terminal disclaimer.

(21) Appl. No.: 12/421,694

(22) Filed: Apr. 10, 2009

(65) Prior Publication Data

US 2010/0262977 A1    Oct. 14, 2010

(51) Int. Cl.
  *G06F 3/00*   (2006.01)
  *G06F 9/54*   (2006.01)

(52) U.S. Cl.
  CPC ................................ *G06F 9/541* (2013.01)
  USPC ........................................................ 719/319

(58) Field of Classification Search
  CPC ....................................................... G06F 9/541
  USPC ............................................ 719/310; 709/225
  See application file for complete search history.

(56) References Cited

U.S. PATENT DOCUMENTS

| | | | |
|---|---|---|---|
| 5,951,650 | A | 9/1999 | Bell et al. |
| 5,996,016 | A | 11/1999 | Thalheimer et al. |
| 6,026,499 | A | 2/2000 | Shirakihara et al. |
| 6,085,086 | A | 7/2000 | La Porta et al. |
| 6,144,999 | A | 11/2000 | Khalidi et al. |
| 6,189,111 | B1 | 2/2001 | Alexander et al. |
| 6,269,442 | B1 | 7/2001 | Oberhauser et al. |
| 6,314,567 | B1 | 11/2001 | Oberhauser et al. |
| 6,321,275 | B1 | 11/2001 | McQuistan et al. |
| 6,496,847 | B1 * | 12/2002 | Bugnion et al. ................. 718/1 |
| 6,560,626 | B1 | 5/2003 | Hogle et al. |
| 6,601,081 | B1 | 7/2003 | Provino et al. |
| 6,718,538 | B1 | 4/2004 | Mathiske |
| 6,766,314 | B2 * | 7/2004 | Burnett ........................ 707/694 |
| 7,028,305 | B2 | 4/2006 | Schaefer |
| 7,058,696 | B1 | 6/2006 | Phillips et al. |
| 7,076,555 | B1 | 7/2006 | Orman et al. |
| 7,089,294 | B1 | 8/2006 | Baskey et al. |
| 7,093,086 | B1 | 8/2006 | van Rietschote |
| 7,197,700 | B2 | 3/2007 | Honda et al. |
| 7,257,811 | B2 | 8/2007 | Hunt et al. |
| 7,269,645 | B2 | 9/2007 | Goh et al. |
| 7,363,365 | B2 | 4/2008 | Ocko et al. |
| 7,523,344 | B2 | 4/2009 | Qiao et al. |
| 7,543,182 | B2 | 6/2009 | Branda et al. |
| 7,577,686 | B1 * | 8/2009 | Larkin et al. ............................ 1/1 |
| 7,673,308 | B2 * | 3/2010 | McMillan et al. ............. 719/331 |

(Continued)

OTHER PUBLICATIONS

Arvind Seshadri, SecVisor: A Tiny Hypervisor to Provide Lifetime Kernel Code Integrity for Commodity OSes, 2007.*

*Primary Examiner* — Lechi Truong
(74) *Attorney, Agent, or Firm* — Haynes and Boone, LLP

(57) ABSTRACT

A system, method, and computer readable medium for providing application isolation to one or more applications. The system may include an isolated environment including application files and executables, and an interception layer intercepting access to system resources and interfaces. The system may further include an interception database maintaining mapping between the system resources inside the isolated environment and outside, and a host operating system, wherein the isolated environments are saved on at least one of a local and remote storage.

16 Claims, 10 Drawing Sheets

Installing and running an Application

(56) References Cited

U.S. PATENT DOCUMENTS

| | | |
|---|---|---|
| 7,694,123 B2 * | 4/2010 | Prasse et al. .................. 713/2 |
| 2002/0087916 A1 | 7/2002 | Meth |
| 2002/0124089 A1 | 9/2002 | Aiken et al. |
| 2002/0169884 A1 | 11/2002 | Jean et al. |
| 2002/0174265 A1 | 11/2002 | Schmidt |
| 2003/0018927 A1 | 1/2003 | Gadir et al. |
| 2003/0069993 A1 | 4/2003 | Na et al. |
| 2003/0140041 A1 | 7/2003 | Rosensteel et al. |
| 2003/0140272 A1 | 7/2003 | Lawrance et al. |
| 2004/0044721 A1 | 3/2004 | Song et al. |
| 2004/0153700 A1 | 8/2004 | Nixon et al. |
| 2005/0071824 A1 | 3/2005 | K. N. et al. |
| 2005/0097394 A1 * | 5/2005 | Wang et al. .................. 714/11 |
| 2005/0213498 A1 | 9/2005 | Appanna et al. |
| 2005/0262097 A1 | 11/2005 | Sim-Tang et al. |
| 2005/0268273 A1 | 12/2005 | Fresko et al. |
| 2006/0015764 A1 | 1/2006 | Ocko et al. |
| 2006/0085679 A1 | 4/2006 | Neary et al. |
| 2006/0090097 A1 | 4/2006 | Ngan et al. |
| 2006/0206873 A1 | 9/2006 | Argade |
| 2006/0262716 A1 | 11/2006 | Ramaiah et al. |
| 2006/0262734 A1 | 11/2006 | Appanna et al. |
| 2007/0007336 A1 * | 1/2007 | Kindberg .................. 235/382 |
| 2007/0156659 A1 | 7/2007 | Lim |
| 2007/0192518 A1 * | 8/2007 | Rupanagunta et al. ......... 710/62 |
| 2007/0260733 A1 | 11/2007 | Havemose et al. |
| 2007/0294578 A1 | 12/2007 | Qiao et al. |
| 2008/0104441 A1 | 5/2008 | Rao et al. |
| 2008/0295114 A1 | 11/2008 | Argade et al. |
| 2008/0301760 A1 | 12/2008 | Lim |

* cited by examiner

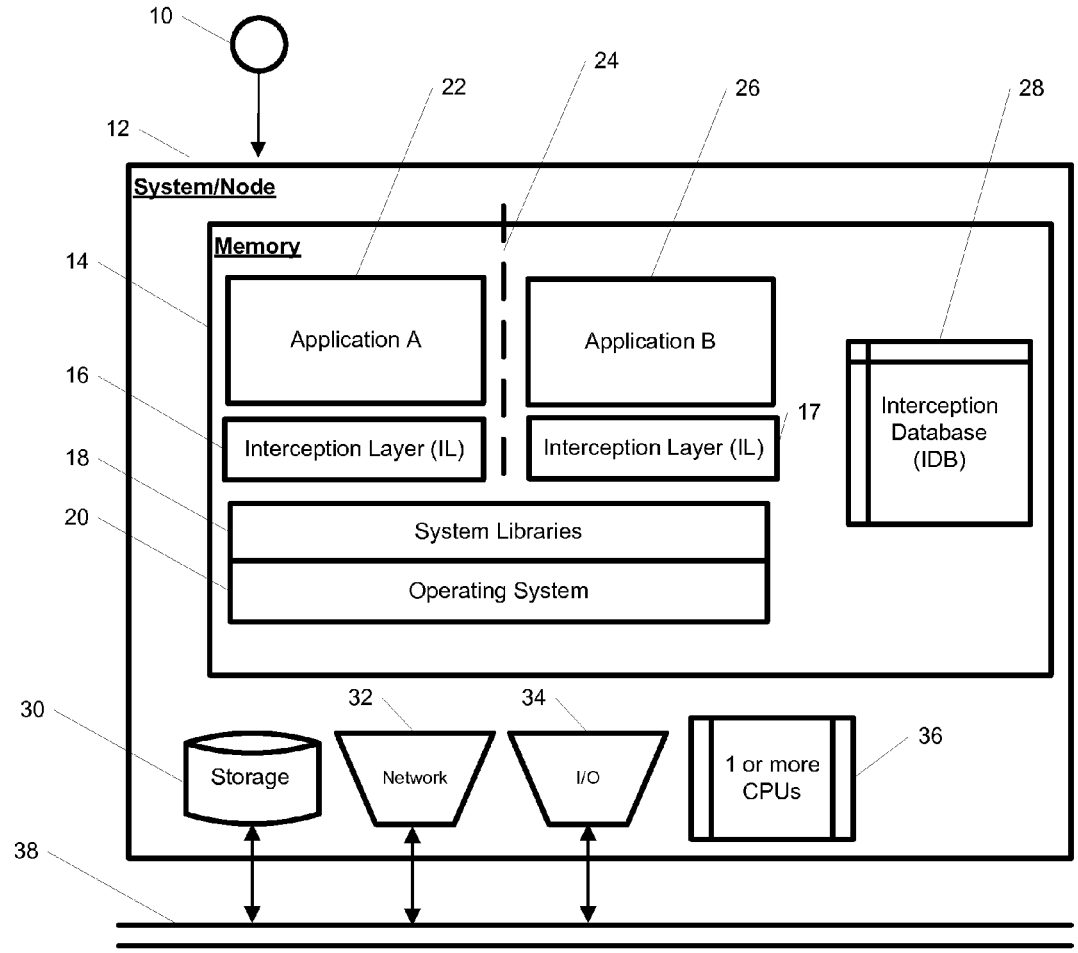
FIG.1 – System Overview

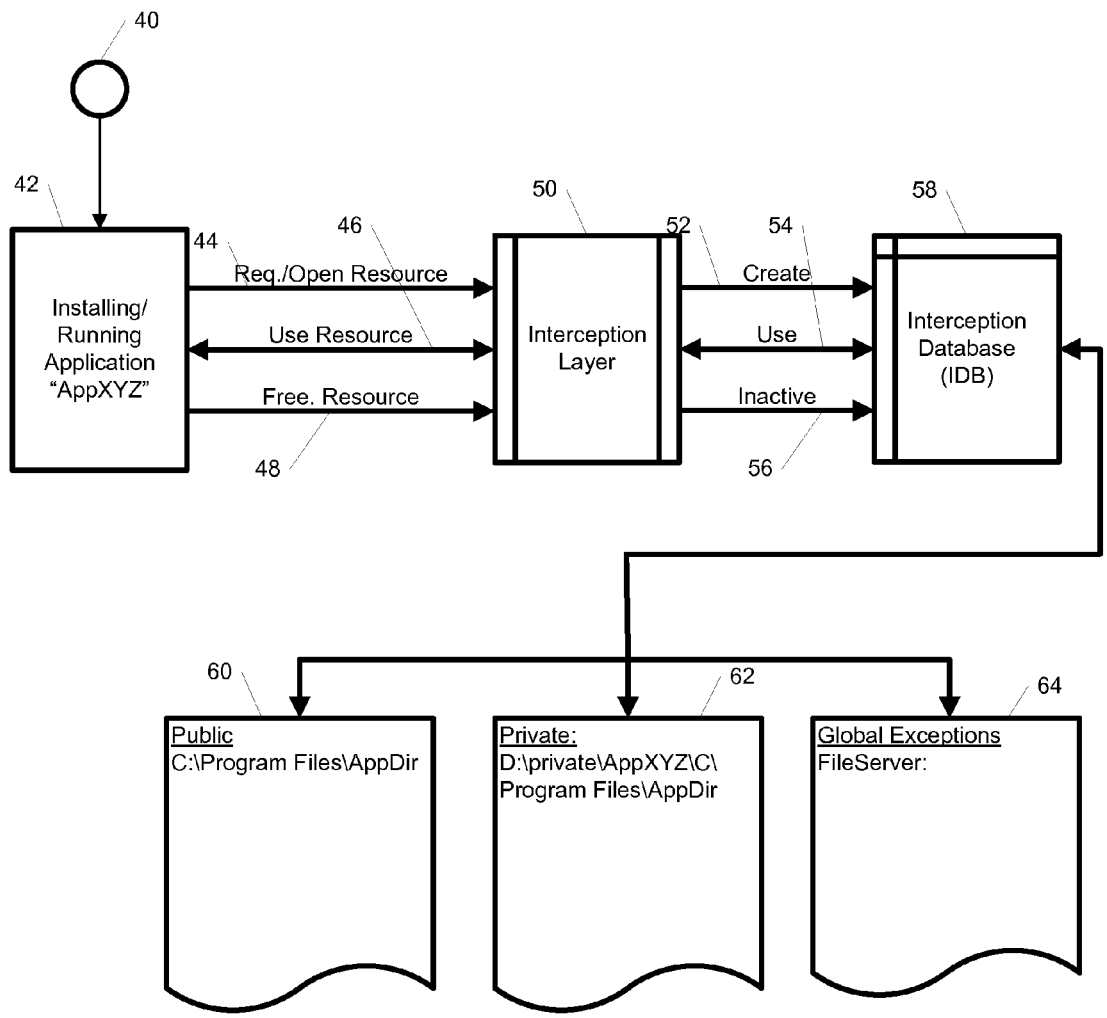
FIG.2 – Installing and running an Application

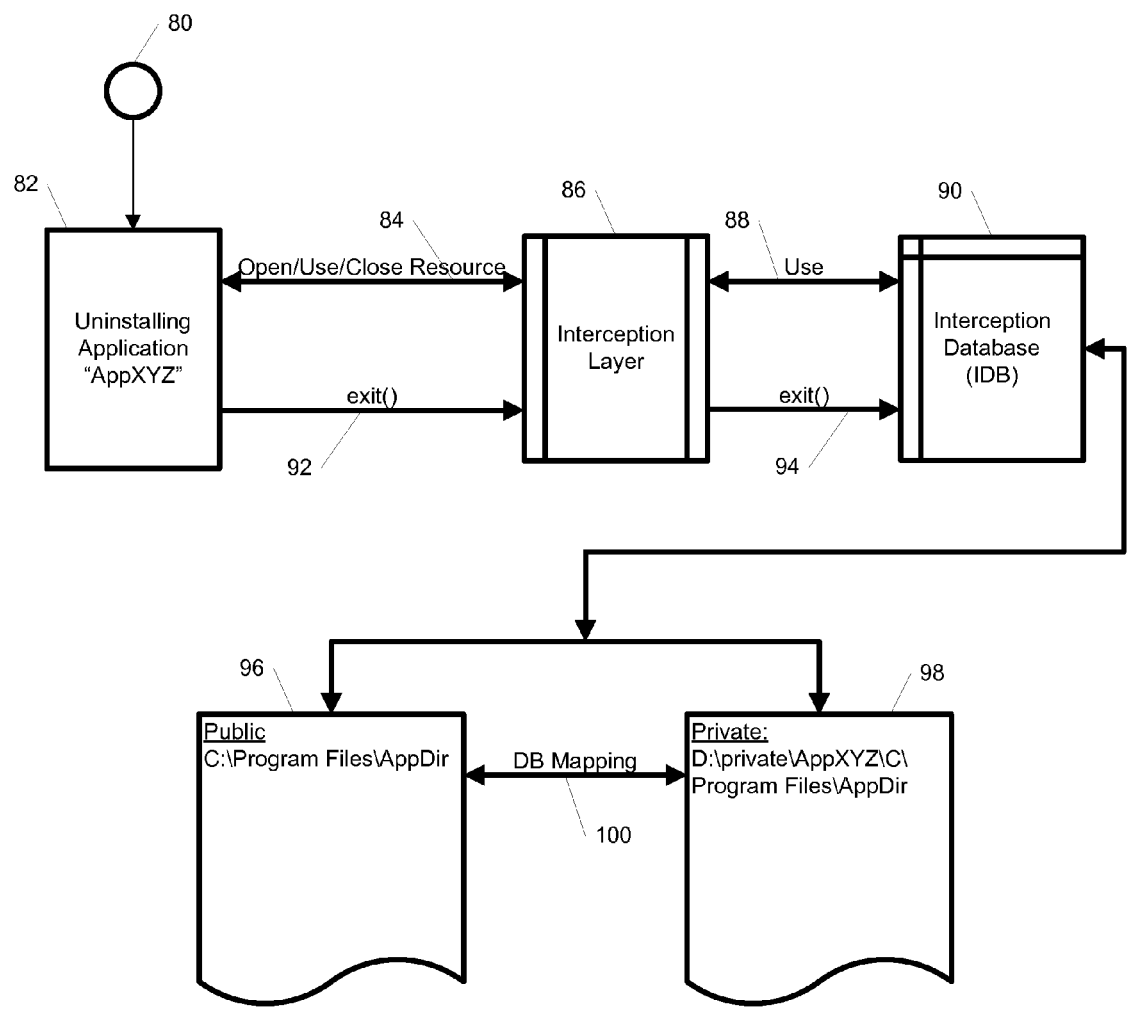
FIG.3 – Un-Installing an Application

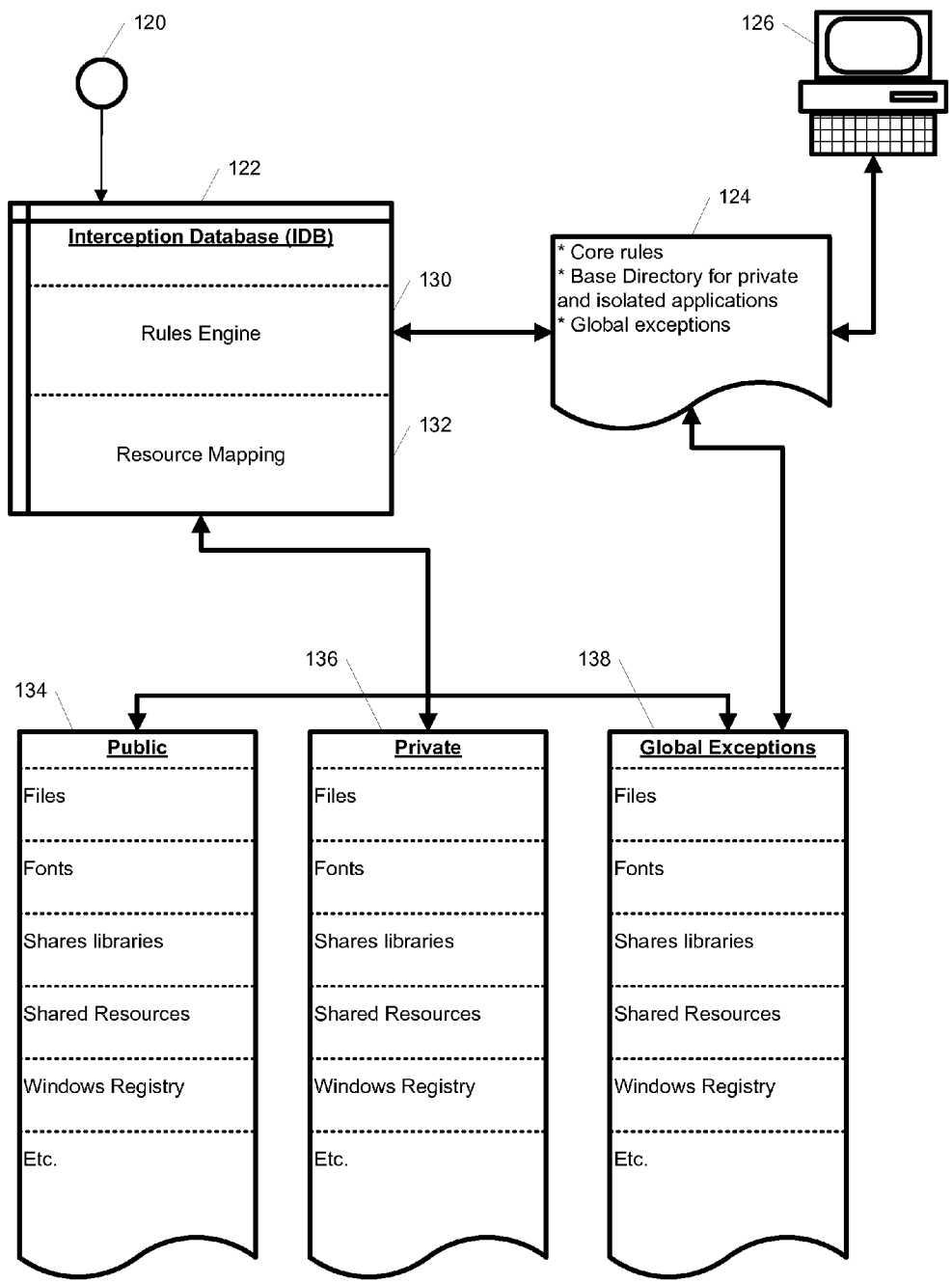
FIG.4 – Interception Database (IDB)

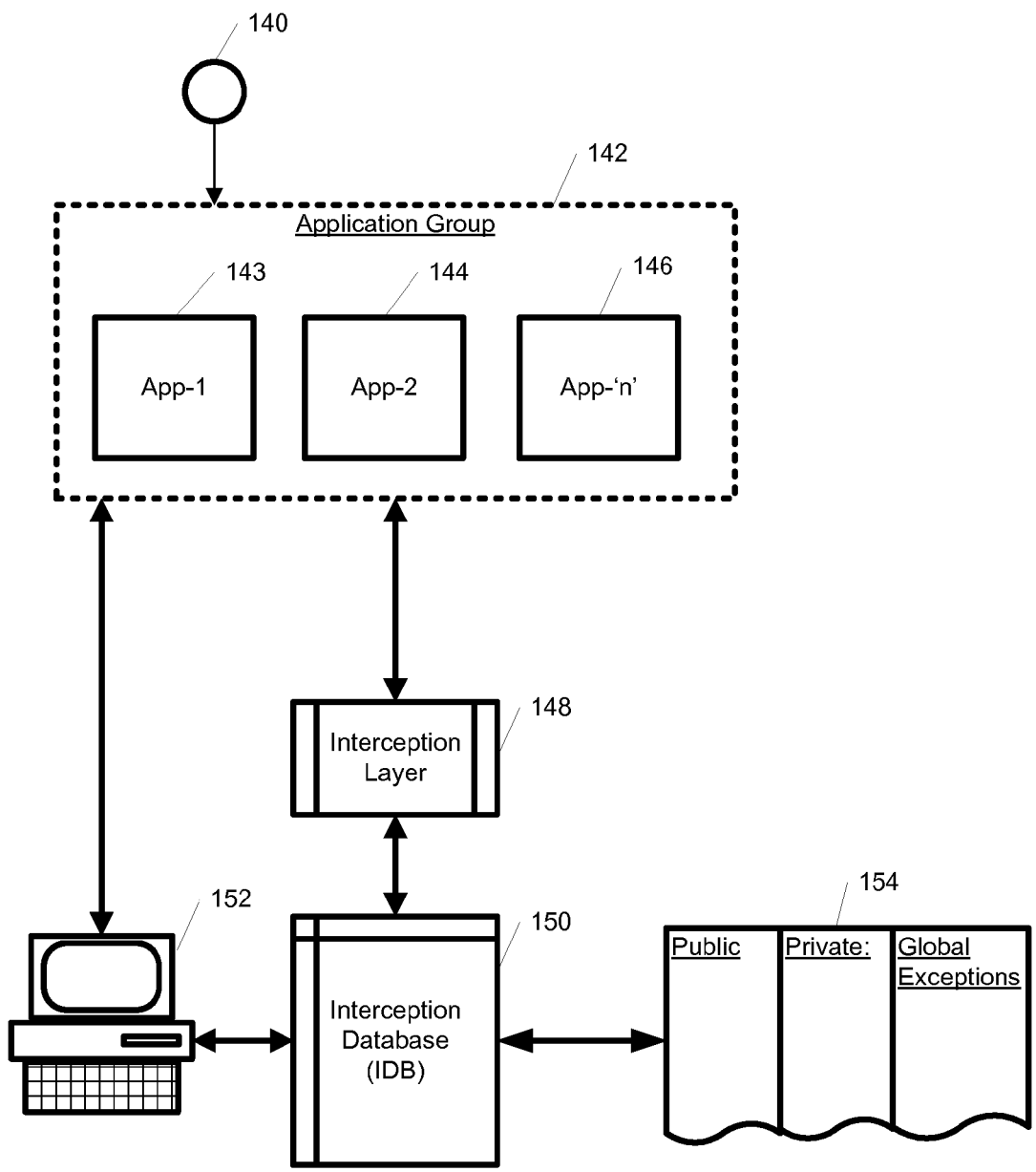
FIG.5 – Application Groups

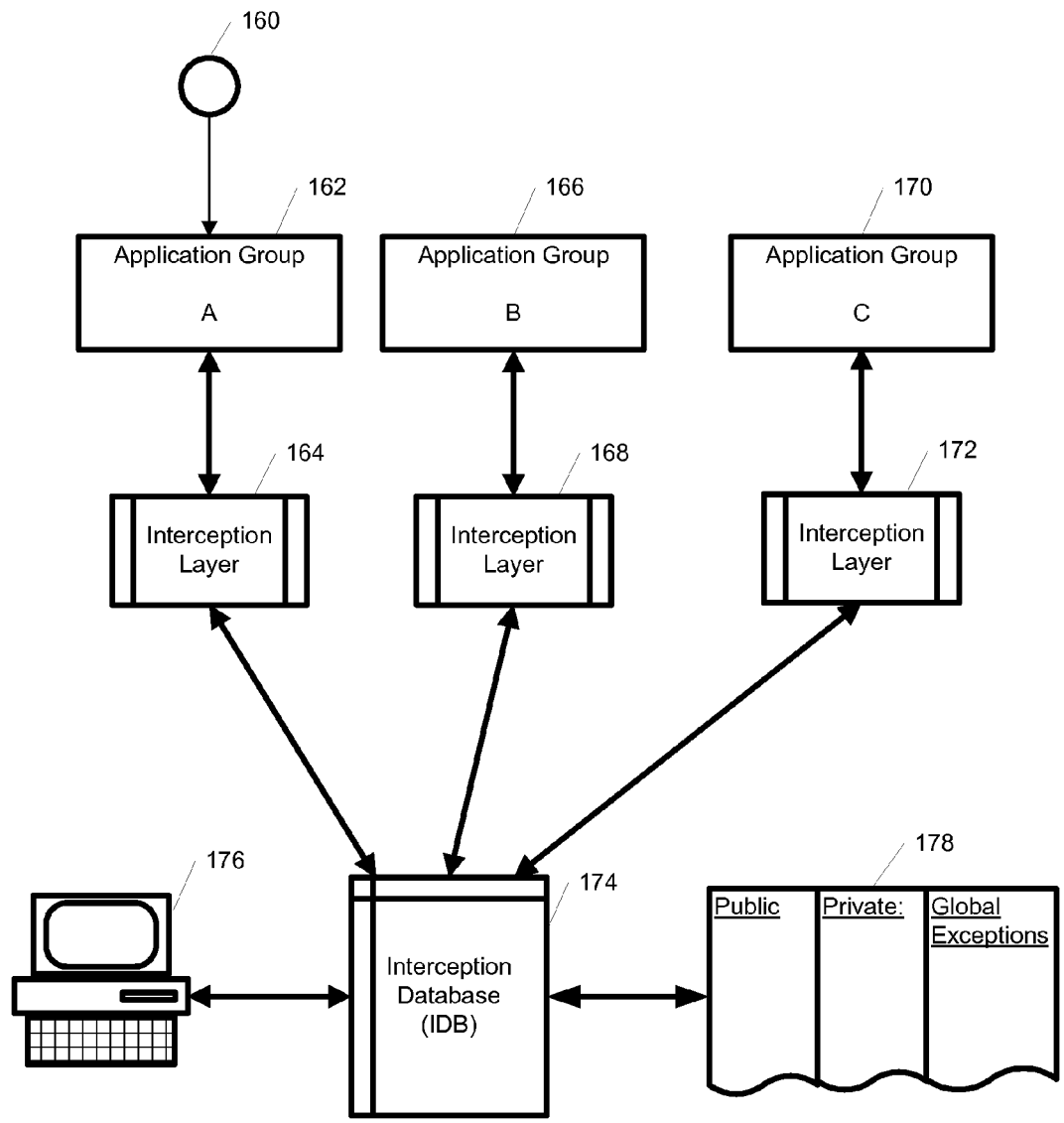
FIG.6 – Multiple Application Groups

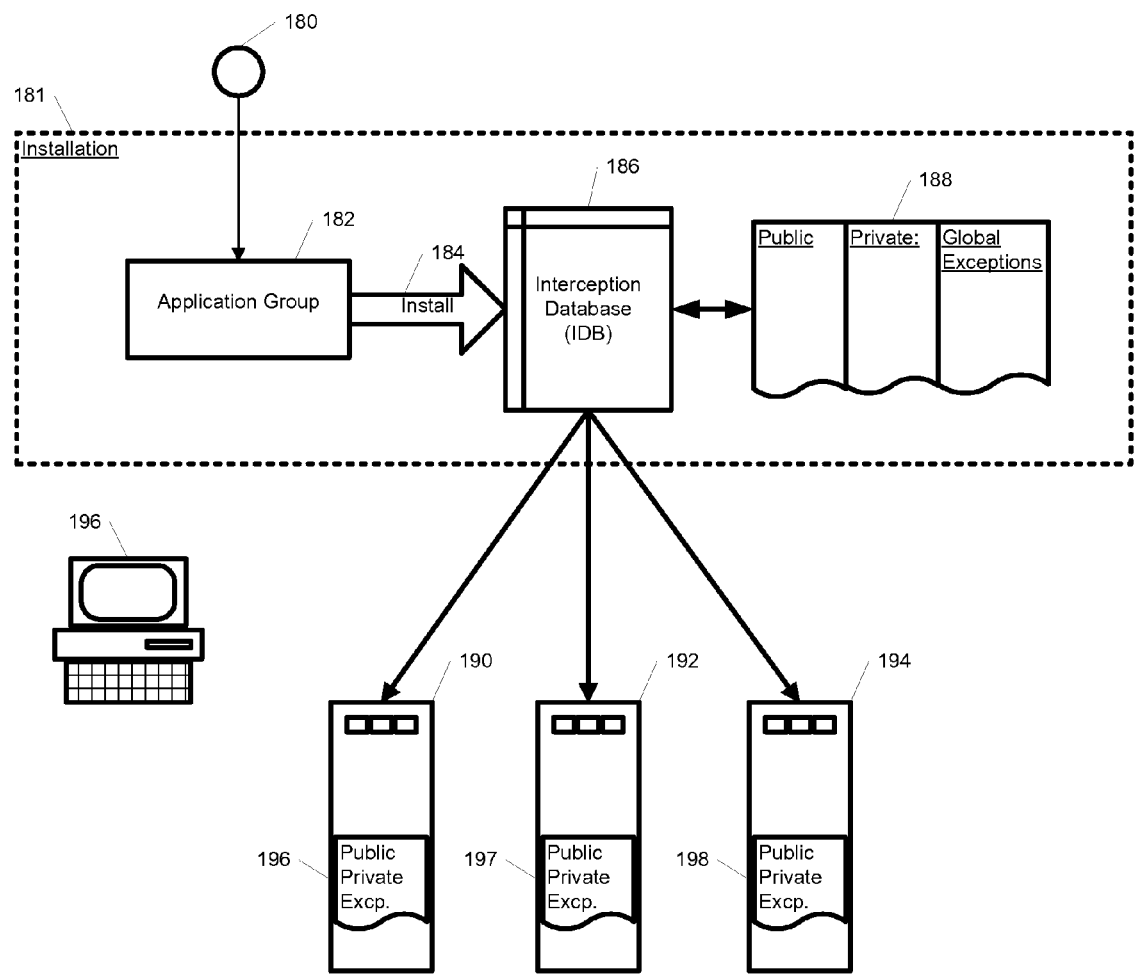
FIG.7 – Installation free deployment

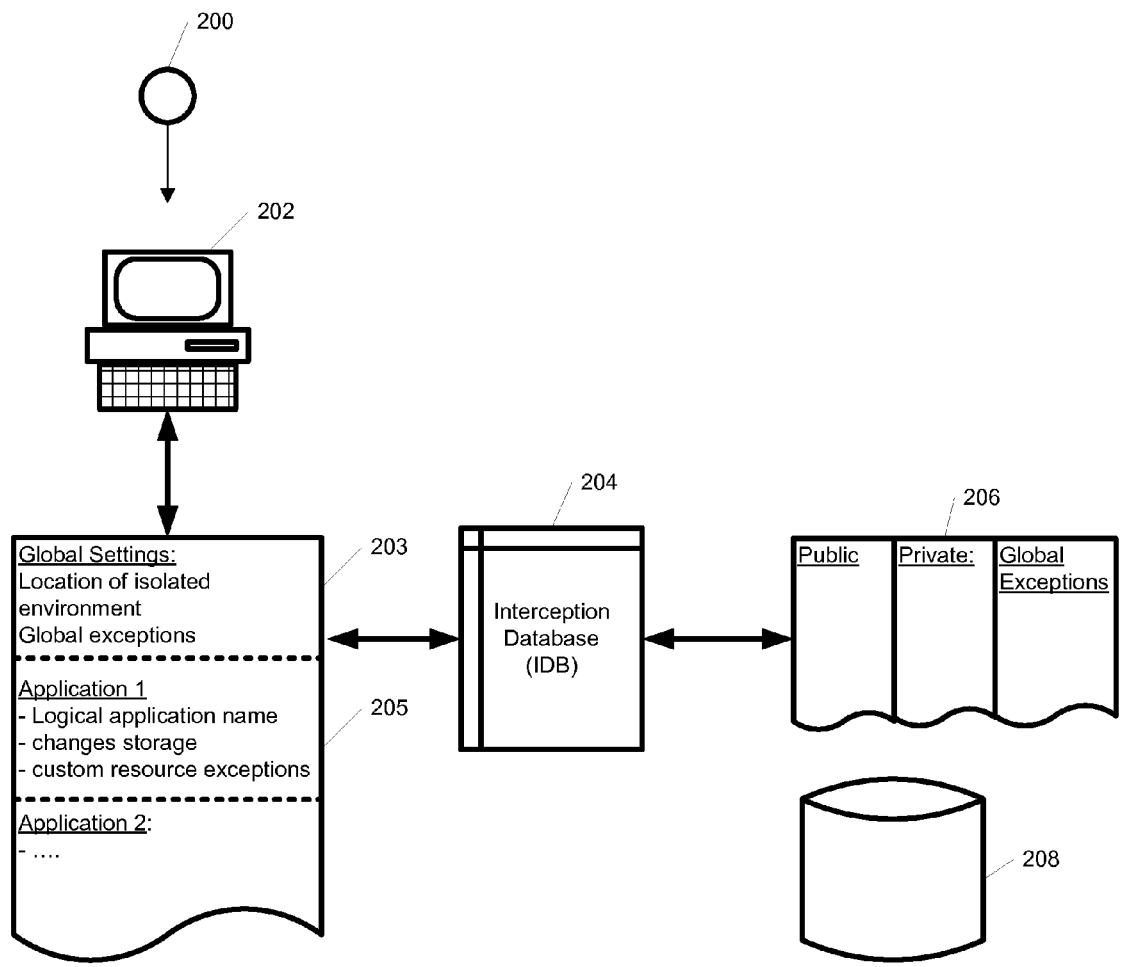
FIG.8 – Administration

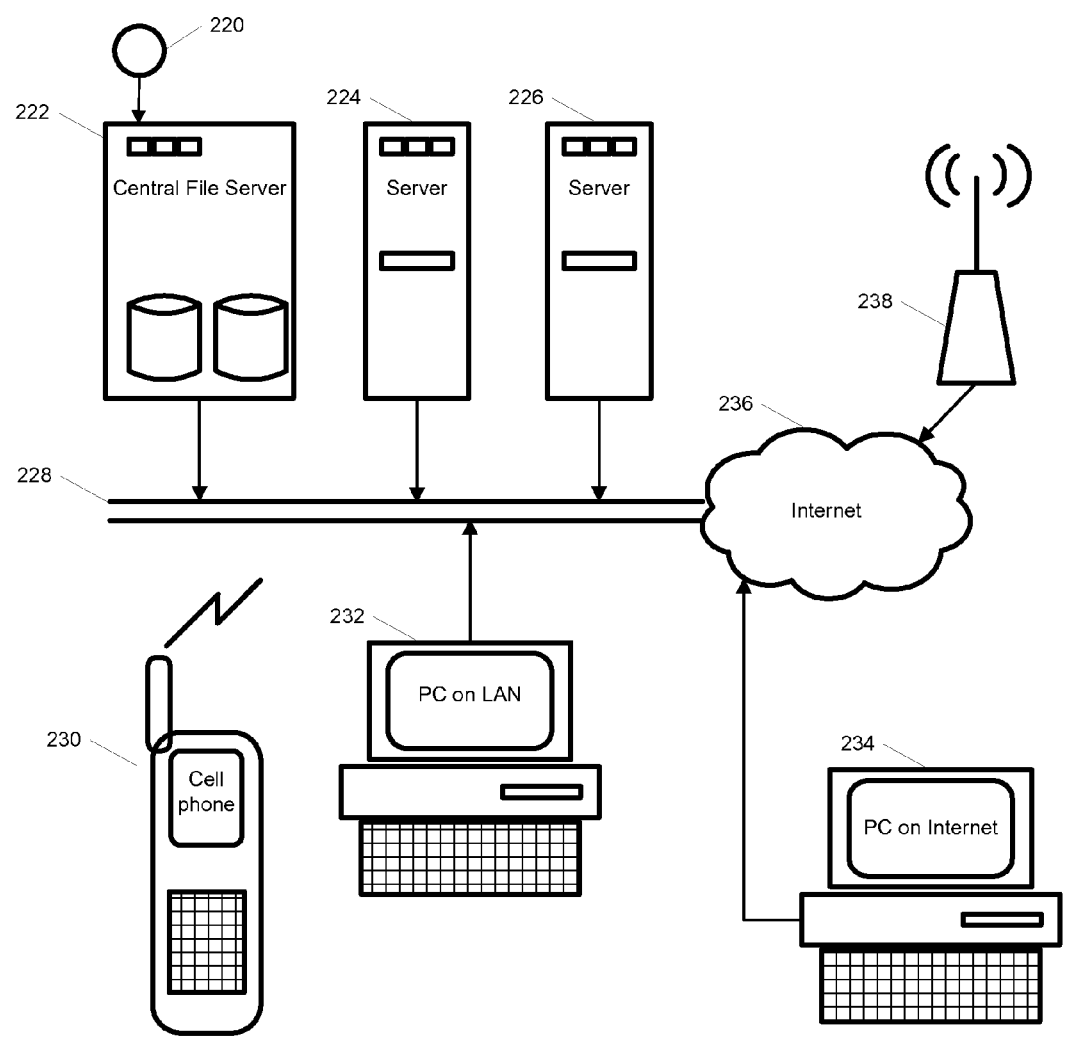
Fig.9 – Deployment scenarios

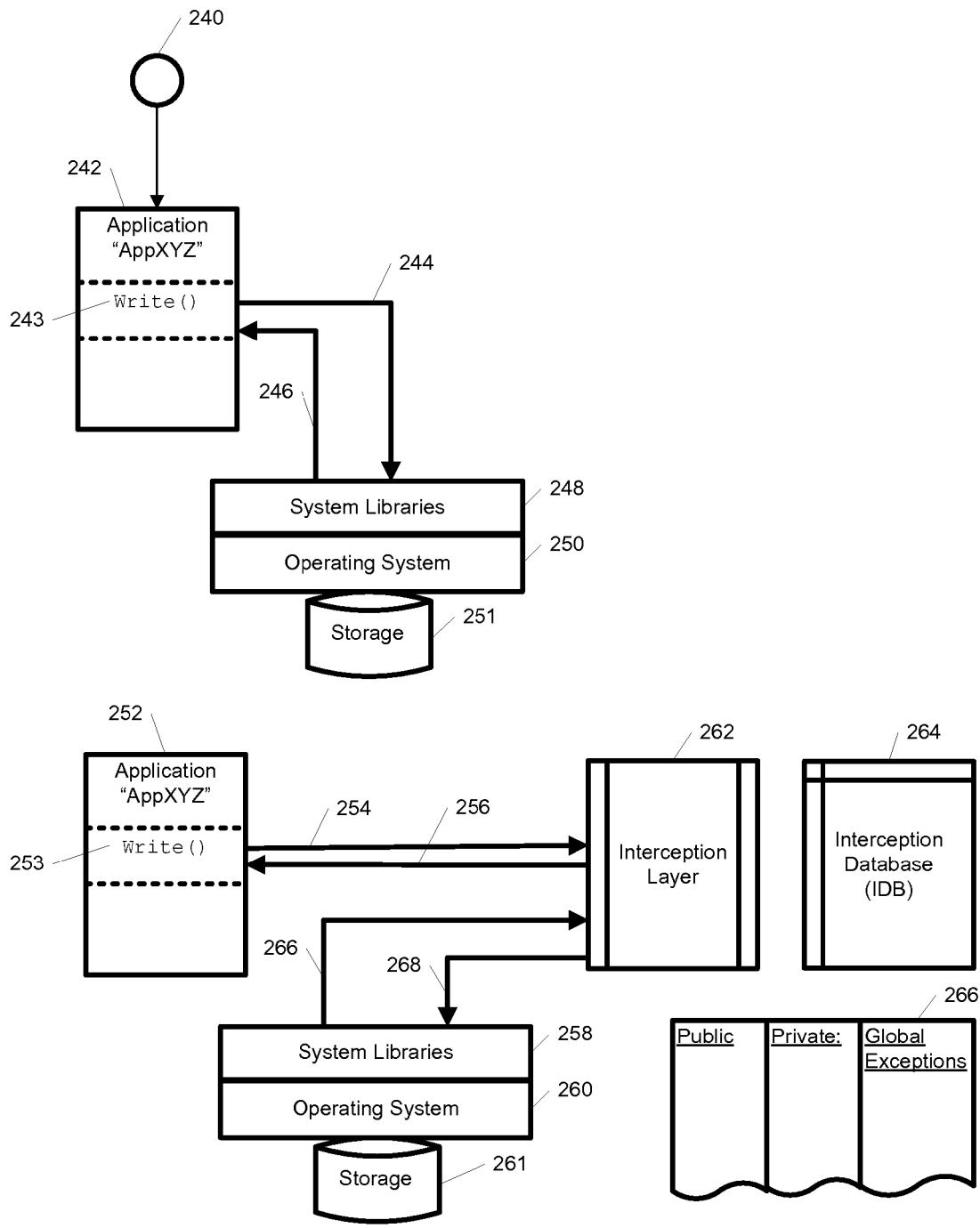
FIG.10 – Detailed control and dataflow

SYSTEM AND METHOD FOR APPLICATION ISOLATION

CROSS-REFERENCE TO RELATED APPLICATIONS

The present application is related to U.S. patent application Ser. No. 12/334,654, filed Dec. 15, 2008, titled METHOD AND SYSTEM FOR PROVIDING STORAGE CHECKPOINTING TO A GROUP OF INDEPENDENT COMPUTER APPLICATIONS, and U.S. patent application Ser. No. 12/334,660, filed Dec. 15, 2008, titled METHOD AND SYSTEM FOR PROVIDING CHECKPOINTING TO WINDOWS APPLICATION GROUPS, the disclosure of each of which is hereby incorporated by reference herein in their entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND OF THE INVENTION

1. Field of the Invention

This invention pertains generally to enterprise computer systems, computer networks, embedded computer systems, wireless devices such as cell phones, computer systems, and more particularly to methods, systems and procedures (i.e., programming) for providing application isolation for multiple applications running on a host operating system.

2. Description of Related Art

In many environments one of the most important features is to ensure that one running application doesn't affect other running applications, and that the crash of one application doesn't compromise other running applications. In many environments applications share system resources, libraries and hardware, which exposes subtle interconnects between seemingly unrelated applications.

Several approaches have been developed addressing this fundamental problem. The first level of application isolation is provided by the operating system. Modern operating systems such as Linux, UNIX, Windows2000, NT, XP and Vista provide some level of application isolation through the use of processes, and the underlying hardware memory management unit. The use of processes generally ensure that one running application process cannot address memory owned and used by other processes. This first level of isolation does not address the use of shared resources, such as files, file systems, shared memory, and libraries, so other approaches have been developed In U.S. Pat. No. 6,496,847 Bugnion et al. teach the use of a virtual machine monitor (VMM) with a protected host operating system (HOS). This invention partially solves the isolation problem by placing every application into its own VMM. The solution requires the use of a VMM subsystem and in some cases a customized operating system. U.S. Pat. No. 6,496,847 does not provide isolation at the level of individual applications, but for entire operating systems with all the applications within it. It does not address the problem of application isolation with multiple natively running applications on one host computer.

In U.S. Pat. No. 6,601,081 Provino et al. teach the use of a virtual machine for a plurality of application programs. As with U.S. Pat. No. 6,496,847 the use of a VM subsystem simply moves the problem to a different layer, and does not address the fundamental issue of application isolation with several natively running applications on one host computer.

In U.S. Pat. No. 7,028,305 Schaefer teaches a system for creating an application protection layer to separate an application from the host operating system. Shaefer primarily teaches how to intercept the Windows registry to capture configuration information for Windows application and how to create a virtual operating environment for the application. Access to files is provided via a virtual file system, access to registry information via the virtual registry etc. For Unix and MacOS few specific teachings are presented.

The present invention provides a system, method, and computer readable medium to create an application isolation environment where applications can run unmodified, on unmodified operating systems without requiring any virtual environments, virtual machines or virtual machine monitors. The present invention also disclosed how to manage and handle applications that share libraries and resources, and how to handle complex multi-process applications. In one embodiment an implementation in the Linux environment is described, in another embodiment an implementation on Windows is described.

BRIEF SUMMARY OF THE INVENTION

A method, system, apparatus and/or computer program are described for achieving application isolation for single and multi-process applications and their associated resources. The application isolation is provided without requiring any changes to the host operating system kernel or requiring any changes to the applications. The application isolation is fully transparent to both operating system and application and automatically adjusts for resources such as memory, storage, and CPUs being allocated and released. The application isolation is provided in an interception layer interposed between the individual applications and the operating system and an interception database. Preferably, any functional changes to system calls are done exclusively within the interception layer and interception database, and only in the context of the calling application.

Another aspect of the present invention relates to a method and a computer readable medium comprising instructions for application and application group isolation. The instructions are for installing the applications into the isolated environment, running the application in the isolated environment, un-installing applications from the isolated environment, configuring the isolated environments, and deploying the isolated environments.

Yet another aspect of the invention relates to a system for providing application isolation to one or more applications, the system comprising: an isolated environment including application files and executables; an interception layer intercepting access to system resources and interfaces; an interception database maintaining mapping between the system resources inside the isolated environment and outside; and a host operating system, wherein the isolated environments are saved on at least one of a local and remote storage.

DEFINITIONS

The terms "Windows" and "Microsoft Windows" are utilized herein interchangeably to designate any and all versions of the Microsoft Windows operating systems. By example, and not limitation, this includes Windows XP, Windows Server 2003, Windows NT, Windows Vista, Windows Server 2008, Windows Mobile, and Windows Embedded.

The terms "Linux" and "UNIX" are utilized herein to designate any and all variants of Linux and UNIX. By example, and not limitation, this includes RedHat Linux, Suse Linux, Ubuntu Linux, HPUX (HP Unix), and Solaris (Sun Unix).

The term "node" and "hos" are utilized herein to designate one or more processors running a single instance of an operating system. A virtual machine, such as VMWare or XEN VM instance, is also considered a "node". Using VM technology, it is possible to have multiple nodes on one physical server.

The terms "application" is utilized to designate a grouping of one or more processes, where each process can consist of one or more threads. Operating systems generally launch an application by creating the application's initial process and letting that initial process run/execute. In the following teachings we often identify the application at launch time with that initial process.

The term "application group" is utilized to designate a grouping of one or more applications.

In the following we use commonly known terms including but not limited to "process" "process ID (PID)", "thread", "thread ID (TID)", "thread local storage (TLS)", "instruction pointer", "stack", "kernel", "kernel module", "loadable kernel module", "heap", "stack", "files", "disk", "CPU", "CPU registers", "storage", "memory", "memory segments", "address space", "semaphore", "loader", "system loader", "system path", and "signal". These terms are well known in the art and thus will not be described in detail herein.

The term "transport" is utilized to designate the connection, mechanism and/or protocols used for communicating across the distributed application. Examples of transport include TCP/IP, Message Passing Interface (MPI), Myrinet, Fibre Channel, ATM, shared memory, DMA, RDMA, system buses, and custom backplanes. In the following, the term "transport driver" is utilized to designate the implementation of the transport. By way of example, the transport driver for TCP/IP would be the local TCP/IP stack running on the host.

The term "interception" is used to designate the mechanism by which an application re-directs a system call or library call to a new implementation. On Linux and other UNIX variants interception is generally achieved by a combination of LD_PRELOAD, wrapper functions, identically named functions resolved earlier in the load process, and changes to the kernel sys_call_table. On Windows, interception can be achieved by modifying a process' Import Address Table and creating Trampoline functions, as documented by "Detours: Binary Interception of Win32 Functions" by Galen Hunt and Doug Brubacher, Microsoft Research July 1999". Throughout the rest of this document we use the term to designate the functionality across all operating systems.

The term "file context" or "context" is used in relation with file operations to designate all relevant file information. By way of example, and not limitation, this includes file name, directory, read/write/append/execute attributes, buffers and other relevant data as required by the operating system.

The term "transparent" is used herein to designate that no modification to the application is required. In other words, the present invention works directly on the application binary without needing any application customization, source code modifications, recompilation, re-linking, special installation, custom agents, or other extensions.

The terms "private and isolated environment" and "isolated environment" are used herein interchangeably to designate the private area set aside for application isolation, as described in further detail below.

The present invention provides application isolation at several levels: 1) during installation, all installation and registration information is intercepted and installation is re-directed to a private and isolated environment, 2) during launch of an application the installation information is retrieved and provided to the application again via interception, and 3) during access to external resources interception of all access is re-directed as necessary. The combination of all levels of isolation provides for fully transparent application isolation. Thus at all times, access to resources, configuration and run-time information is intercepted and redirected.

By way of example, and not limitation, for embodiments within Windows operating systems, access to the Windows Registry is intercepted and included in the application isolation.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

FIG. 1 is a block diagram of the core system architecture showing two applications, the interception layer, and the interception database.

FIG. 2 is a block diagram illustrating installation and running of applications

FIG. 3 is a block diagram illustrating un-installation

FIG. 4 is a block diagram illustrating the Interception Database

FIG. 5 is a block diagram illustrating running application groups

FIG. 6 is a block diagram illustrating running multiple application groups concurrently FIG. 7 is a block diagram illustrating installation-free deployment FIG. 8 is a block diagram illustrating administration FIG. 9 is a block diagram illustrating various deployment scenarios FIG. 10 is a block diagram illustrating interception data and control flow

DETAILED DESCRIPTION OF THE INVENTION

Referring more specifically to the drawings, for illustrative purposes the present invention will be described in relation to FIG. 1 through FIG. 10. It will be appreciated that the system and apparatus of the invention may vary as to configuration and as to details of the constituent components, and that the method may vary as to the specific steps and sequence, without departing from the basic concepts as disclosed herein.

1. INTRODUCTION

The context in which this invention is described is one or more applications being installed, running and accessing local and remote resources. Without affecting the general case of multiple applications, the following scenarios often depict and describe one or two applications as applicable. Multiple applications are handled in a similar manner.

1. Overview

FIG. 1 illustrates by way of example embodiment 10 the overall structure of the present invention. The following brief overview illustrates the high-level relationship between the various components; further details on the inner workings and interdependencies are provided in the following sections. FIG. 1. Illustrates by way of example embodiment 10 two applications A 22 and B 26 loaded in memory 14 on a node 12. The interception layers 16, 17, are interposed between the applications 22, 26 and the system libraries 18 and operating system 20. The interception database 28 provides system-wide persistent interception information and configuration information for the isolated environments. The interception layers 16, 17 combined with the Interception database 28 provides application isolation 24. System resources, such as CPUs 36, I/O devices 34, Network interfaces 32 and storage 30 are accessed using the operating system. Devices accessing remote resources use some form of transport network 38. By way of example, system networking 32 may use TCP/IP over Ethernet transport, Storage 32 may use Fibre Channel or Ethernet transport, and I/O may use USB. The present invention access and arbitrate resources through the operating system and does not work at the transport level.

2. Installing and Running Applications

FIG. 2 illustrates by way of example embodiment 40 installation of a typical application "AppXYZ" 42. The Interception Layer (IL) 50 intercepts all calls to system libraries and the operating system. IL 50 communicates with the Interception Database (IDB) 58 to create a private and isolated environment where the application can execute without depending on or affecting other parts of the environment. By way of example, and not limitation, first the installation process requests a resource 44, such as opening a file. The resource request is intercepted by IL 50 and a request to create 54 a private instance of the resource is made to the Interception Database (IDB) 58. The IDB 58 is a system wide database containing mappings 60, 62, 64 between the resources as the application 42 requests them 60, and their private values inside the isolated environment 62, subject to global exceptions 64. Further details on the IDB are given in section 4 below. By way of example, and not limitation, if the resource request 44 was to create a file in C:\Program Files\AppDir, the IDB may map that to a private location 62, such as D:\private\AppXYZ\C\Program Files\AppDir. So while AppXYZ 42 operates under the assumption that it's working on C:\Program Files\AppDir, in reality all access has been intercepted and re-directed to a private and isolated environment in D:\private\AppXYZ\C\Program Files\AppDir. The IDB 58 returns 54 the private resource to IL 50, which returns the resource handle 46 to the application 42. As the application 42 uses the resource 46 it operates under the assumption that the original resource request was satisfied, and is unaware that all resources have been relocated to a private and isolated environment. When use of the resource is terminated 48, the IL 50 sends a message to the IDB 58 that the resource currently is inactive 56. All mappings are maintained in the IDB 58 after the installation finishes as they may be needed after the initial request.

FIG. 2 also illustrates, by way of example embodiment 40, how an application 42 runs after being installed. As resources are opened, used, and freed, the same steps as described above are used. As the application 42 executes, it generally access or create resources not used during installation. By way of example, if AppXYZ 42 is a word processor, the user may create a document and save it to storage. That document did not exist as part of the installation process, but is handled using the same mechanisms previously taught. As the user choose to create a new document, AppXYZ 42 makes a request 44 to have the file created. This is intercepted by the IL 50 and forwarded 52 to the IDB 58. The IDB creates a mapping between the Applications 42s public document name 60, and the private and isolated document name 62. As with Application 42 information stored in the IDB 58, so is the application data information stored persistently until un-installation.

At times it may be desirable to store some user-data outside the isolated environment, such as on a central file server. In a preferred embodiment, this is supported by specifying which resource locations should remain fixed and public in the global exceptions 64. Such public resources are not translated into the isolated environment.

3. Uninstalling Applications

FIG. 3 illustrates by way of example embodiment 80, un-installation of a typical application AppXYZ 82. The un-installation uses and requests resources 84, which are intercepted by the IL 86 and redirected 88 by the IDB 90, as described above. All actions, such as deletion of files, are re-directed to the private and isolated location. When the un-install terminates, sometimes called exit( ), the exit is intercepted 92 by the IL 86, and forwarded 94 to the IDB 90. The IDB 90 removes all entries mapping 100 application AppXYZ 82 resources 96 against its isolated environment 98. The application is now uninstalled, and all isolation information has been removed.

4. Interception Database and Resource Mapping

The Interception Database (IDB) is a system wide database containing mappings between the resources as the application requests them, and their private values inside the isolated environment. FIG. 4 illustrates, by way of example embodiment 120, the Interception Database (IDB) 122, and its various components. The IBD 122 contains two main components, a rules engine 130 and the core resource mappings 132. The rules engine 130 contains the main high-level configuration information 124 as provided by an administrator 126. The rules engine 130 and its configuration information 124 includes, but is not limited to, information designating the base directory for installing the isolated environment, specific exceptions 138 to the resource mappings and the general mechanism used to create the mappings. The administrator 126 defines exceptions 138 as needed. The global exceptions contain all resources that should not be remapped to the isolated environments. Examples include, but are not limited to, shared storage, shared devices, network resources, and system-wide resources.

The resource mapping 132 maintains mapping between public resources 134 and the corresponding private and isolated resources 136. The resource mapping 132 also consults the global exceptions 138 prior to translating any public to private or private to public resource requests.

Resources take many forms including but not limited to files, fonts, shared libraries, shared devices, and storage. On Microsoft Windows the Registry is an important component and contains system wide configuration information used by most applications. Some resources, such as data files, tend to be local to the individual applications, while e.g. fonts tend to be shared between multiple applications.

Access to files are handled by the IL (FIG. 2-50) intercepting all file operations between the application and the system libraries and operating systems. Examples include, but are not limited to open( ), fopen( ), write( ), read( ), close( ), seek( ), remove( ) and the Windows equivalents. Generally these functions either contain a public file name as part of the arguments, or a file handle to an already established file. The files names are remapped as described above, to an isolated environment, and any further reference to the handle is automatically re-directed to the isolated environment. File operations that return information, are translate back to the public values. By way of example, and not limitation, if the applications ask for "current directory", the public name, as the application expects is returned, and not the private name within the isolated environment. By way of further example, if the current directory is located on shared storage included the global exceptions 138, the directory is returned un-translated, as it's subject to the exception handling.

File, paths and other resource names can be specified both as absolute values or relative values. By way of example, and not limitation, an absolute path for a document file may be "C:\MyDocuments\myfile.doc", while a relative reference may be ". . \docs\myfile.doc". Absolute references are resolved as previously described by consulting the public resources 134, private resources 136 and global exceptions 138. Relative addresses are resolved in a multi-step process: First relative names are converted to absolute names and then the absolute name is converted as previously described. This mechanism ensures fully transparent support of both absolute and relative naming of all resources.

Fonts pose particular problems, as fonts reside both in application-specific directories and global system directories, such as "C:\Windows\Fonts" on Windows and "/usr/X11R6/lib/X11/fonts/" and "/usr/share/fonts/" on Linux. An application may install font both into one or more global font directories as well as application-specific directories. All shared-fonts directories are included in the Global Exceptions 138 as they should be accessed directly. If during installation additional fonts are installed, they are installed according to the policy chosen by the administrator 126. Prior to installation, the administrator chooses if application-installed fonts are allowed to be placed in the global fonts directory or if they should be placed in the isolated environment. The rules engine 130 consults this administrative choice and upon receiving a request to enumerate the font directory will include isolated-environment fonts if so configured. If the application installs its fonts into its own file structure, the fonts are treated as normal files and are not subject to the automatic enumeration as the application knows where to look for its application-specific fonts.

Modern operating systems share components across multiple applications. Such shared libraries also pose a special case. On Windows Dynamic Link Libraries (DLLs) and on Linux/UNIX shared objects (.so files) are examples of such shared components. On Window shared libraries primarily reside in C:\Windows and C:\Windows\System32, but can sit anywhere. On Linux/Unix the primary locations are '/usr/lib', '/usr/X11/lib' and the entire /usr/lib/ directory structure. The loader of the operating system traverses the system PATH to find any requested shared library, but this can be manually or programmatically changed as part of the load process. The PATH is set using environment variables both on Windows and Linux. In order to intercept loading of shares libraries the present invention loads the application in stead of using the system loader directly. This enables interception of library loading done by the loader. If during installation additional shared libraries are installed, they are installed according to the policy chosen by the administrator 126. Prior to installation, the administrator chooses if application-installed libraries are allowed to be placed in a global directory or if they should be placed in the private and isolated environment. If the libraries are placed into the private and isolated environment, the load PATH is adjusted to search the private location.

As with files, libraries can be loaded with both absolute and relative addresses. The load process handles the resource mapping as described above. In all cases, the loading must follow the same path and address resolution as the system loader provides.

If the application installs its shared libraries into its own file structure, the libraries are treated as normal files and are not subject to an adjusted PATH or load-order as the application knows where to look for its application-specific libraries. In the preferred embodiment, if the application installs new shared libraries, they are installed into the isolated environment One of the most significant sources of application incompatibilities, and one of the motivators for the present invention, is shared library conflict. By way of example, and not limitation, if a shared library is loaded on the system, and a new application installs an older version of the library, the older version may overwrite the newer version and render other applications non-functional based on having their shared library replaced by an incompatible older version. This is a common problem on both the Windows and Linux platforms. Using the preferred embodiment described above, the application would install the older library into its isolated environment and therefore not affect other applications. The application would load and use the older library without ever being aware that it was provided from the isolated environment, and other applications running on the system would be unaffected by the installation of the older library.

Microsoft Windows uses a special configuration system generally referred to as "the Registry". The registry contains configuration, installation and un-installation information for applications on the system. When an application installs on a Windows system, it uses the registry to store values such as "home directory", "recent files", etc. The preferred embodiment on Windows systems additionally include interception of all registry information, and ensures that installation and runtime information that would normally go into the registry, in stead is stored and maintained in the IDB. During installation of a Windows application all registry information is thus stored in the IDB and not the registry. When an application requests registry information, the information is provided from the IDB, and not the registry. This ensures complete application isolation from the registry.

The isolated environment contains all application files and shared resources and their respective mappings. These are all preserved persistently on local or remote storage and can be archived, copied and restored as any other set of files. Specifically, the isolated environment directory structure can be copied to a different node, and used directly to start the application on that node.

So far the Interception database has been described as a "database". Based on the teachings above, it's readily apparent to anyone skilled in the art, that the only requirement is that updates to the resource tables 134, 136 and 138 be atomic at the record level. This functionality can be readily implemented in a variety of ways, including using Java's ConcurrentHashMap( ), the Windows .NET equivalents, or by custom programming the data structures and locking. Furthermore, preferably concurrent access to the Interception Database translations is provided. In an alternate implementation such a custom interception database is used in stead of a full database.

5. Interception Data and Control Flow

FIG. 10 illustrates by way of example embodiment 240 the data and control flow in more detail. By way of example, and not limitation, consider first an environment with the present invention inactive. An application 242 calls a write( ) 243 operation. The write operation is resolved by the operating system loader and directed 244 to the system libraries 248 and operating system 250, and ultimately writes data to storage 251. Return value is returned 246 to the caller 243 within the calling application 242.

By way of example, and not limitation, consider an environment with the present invention active. An application 252 calls a write( ) 253 operation. As described in above, the write( ) is intercepted 254 by the interception layer 262. Parameters to the write( ) call are translated by the Interception Database 264 and the rules for the isolated environment 266 and the file context and parameters of the calling write are adjusted to point to the isolated environment. The write call 268 is then forwarded to the system libraries 258 and operating system 260 as were the case with the present invention inactive. The return value 266 from the write is returned to the IL 262 which, using the IDB 264, maps the result back into the original context and returns the value 256 to the caller 253. The application 252 issuing the write 253 operating is thus unaware that the write is being intercepted and re-directed to the isolated environment. All translation and isolation is performed outside the application 252, and before the write operation ever reaches the system libraries 258 or operating system 260.

A specific example, using ANSI C, further illustrates the mechanics of the IL 262 and IDB 264 translations. Consider an example where a file is opened for writing, a small text is written, and the file is closed using the following code

```
int main(void)
{
    char const *pStr = "small text";
    FILE *fp = fopen("/home/user/newfile.txt", "w")
    if (fp != null)
        fwrite(pStr,strlen(pStr),1,fp);
    fclose(fp)
}
```

The call to fopen( ) returns a file pointer, which the fwrite( ) operation uses to write data to the file. The call to fopen( ) includes the file name "/home/user/newfile.txt" as the first parameter. The Interception Layer 262 intercepts the call to fopen( ) and changes the actual filename to the corresponding location in the isolated environment before passing 268 the call on to the system library implementation 258. The following fwrite( ) operation is unaware that the file pointer points to the isolated environment and simply writes the data. Finally, fclose( ) is called to close the file. The file pointer still points to the isolated environment and the close proceeds as a close would without the present invention active.

6. Application Groups

At times multiple applications share data, libraries and work in combination. By way of example, and not limitation, Microsoft Word may include a Microsoft Excel spreadsheet. In general any number of applications may need to collaborate and share data. So far the approach has been to isolate applications so that, to continue the example, if Word and Excel were installed separately, they would both be isolated and not able to work together. To enable sharing between pre-designated applications, the applications need to be grouped together in an application group and installed inside the same isolated environment. FIG. 5 illustrates by way of example embodiment 140, an application group 142 operating within the present invention. The administrator 152 pre-defines the application group 142 and the individual applications within the group: App-1 143, App-2 144 and App-n 146. The administrator 152 commits the application group to the IDB 150. The IDB uses the same mechanisms as described above for individual applications, and structures the isolated environment 154 so that the individual applications share resources and file system. By installing the applications together they automatically use the same isolated environment and sharing is fully automatic without requiring any additional information. The interception layer 148 intercepts, as previously described, and requires no special configuration; all application group information is contained within the IDB 150 and the settings for the isolated environment 154.

7. Concurrent Operation of Multiple Application Groups

FIG. 6 illustrates by way of example embodiment 160, concurrent operation of three application groups: application group A 162, application group B 166 and application group C 170. Each application group consists of one or more applications. As previously described each application group has a dedicated interception layer: IL 164 for application group A 162, IL 168 for application group B 166, and IL 172 for application group C 170. Each interception layer 164, 168, 172 provide the interception services as previously described, with each attached to only one application group. As previously disclosed, the Interception Database 174 is global, and is shared between all application groups and interception layers.

The administrator 176 commits all administrative settings to the IDB 174, which is reflected in the database tables for the isolated environment 178.

8. Running Multiple Concurrent Instances of One Application

At times it may be desirable to run multiple instances of the same application or application group, but in separate isolated environments. Referring again to FIG. 6 for illustrative purposes. The administrator 176 defines each instance of the application group using separate application group names. Even though Application Group A 162, Application Group B 166, and Application Group C 170 are identical, they have been pre-defined with their own environment, and thus run in separate isolated environments without any further intervention or configuration.

9. Installation-Free Deployment

One of the major problems with application deployment is the actual installation and the associated risks as described previously. Using the present invention, a pre-created isolated environment can be used in place of performing an actual installation. The isolated environment contains all application files, shared libraries, and installation data and can be moved, copied and run from anywhere the present invention is present.

FIG. 7 illustrates by way of example embodiment 180, how to deploy an isolated environment without needing more than one initial installation 181. First the administrator 196 installs 184 the application group 182. As previously taught the interception database 186 creates an isolated environment 188 which contains all application group data, including shared files, data and programs. As taught above, the isolated environment is written to storage and can be copied and run elsewhere. With the isolated environment ensuring isolation from the underlying operating system and applications, an isolated environment can be deployed on a different node by copying the entire isolated environment directory structure to the new node and starting the application. Referring to FIG. 7, the administrator 196 copies the isolated environment 188 into the first node 190, the second node 192 and the third node 194.

In an alternate embodiment, the environment 188 is stored on shared storage, and is accessed directly from the shared storage. In this embodiment, the isolated environment is loaded directly from shared storage, and only local data, such as temporary files, are kept locally.

In another embodiment, the environment 188 is saved to storage and shipped to a remote site. The remote site loads the environment and runs the applications directly from within the environment without any installations. In this embodiment the present invention may be used for disaster recovery.

10. Administration

FIG. 8 illustrates by way of example embodiment 200, the management infrastructure. The administrator 202 communicates configuration preferences to the Interception database 204 for each isolated environment 206. The IDB 204 contains, as described above, two separate modules: 1) a rules engine (FIG. 4—130) and 2) management of the resource mappings (FIG. 4—132). The rules engine implements the administrator provided resource translations and populates the tables (FIG. 4—134, 136, 138).

The administrator 202 provides general configuration information applicable to all isolated environments and applications 203, unless explicitly changed for a particular isolated environment 205. Examples of administrator-provided global configuration information 203 includes, but is not limited to
- Default storage location for all isolated environments
- Default resource exceptions
- Default application and application group naming
- Default policy for installing fonts and shared resources into global or isolated environment Each setting can be changed, i.e. replaced, on an application by application basis, and on an application-group by application basis. As determined by the administrator, examples of administrator-provided application-level configuration information 205 include, but is not limited to
- Storage location for isolated environment
- Logical name of application or application group
- Application or application-group specific resource exceptions
- Policy for installing fonts and shared resources into global or isolated environment The combination of the global configuration information 203 with the rules engine (FIG. 4—130), makes the configuration and deployment on new isolated environment fully automatic after the initial global configuration has been provided. As described, it may be desirable to change one or more of an application's isolated environment settings. By way of example, and not limitation, if a particular application needs to locally access certain resources only available on a particular server, that one application's isolated environment would be located on that particular server, while all other environments were centrally stored. The ability to "mix and match" environments and deployments ensure full flexibility and ability to deploy multiple applications in a heterogeneous environment with all the benefits of the present invention.

In another embodiment the administrative functions 202 is done programmatically using an Application Programming Interface (API).

11. Deployment Scenarios

FIG. 9 illustrates by way of example embodiment 220 a variety of ways the invention can be configured to operate. In one embodiment, the invention is configured to run from a central file server 222, in another it is configured to run on a pair of application servers 224, 226. In a third embodiment the invention is configured to run on a LAN 228 connected PC 232 together with the application servers 224, 226, and with environments loaded from the central file server 222. In a fourth embodiment the invention is configured to isolate applications on a cell phone 230, which is wirelessly connected 238 to the Internet 236, the application servers 224, 226 and the file server 222. A fifth embodiment has an isolated environment on a home-PC 234 connected via the internet 236 to the application servers 224, 226 and the LAN PC 232. The invention runs on one or more of the devices, can be distributed across two or more of these elements, and allows for running the invention on any number of the devices (222, 224, 226, 230, 232, 234) at the same time

12. Conclusion

In the embodiments described herein, an example programming environment was described for which an embodiment of programming according to the invention was taught. It should be appreciated that the present invention can be implemented by one of ordinary skill in the art using different program organizations and structures, different data structures, and of course any desired naming conventions without departing from the teachings herein. In addition, the invention can be ported, or otherwise configured for, use across a wide-range of operating system environments.

Although the description above contains many details, these should not be construed as limiting the scope of the invention but as merely providing illustrations of some of the exemplary embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A computer system for providing application isolation to one or more applications, the computer system comprising:
    computer system memory comprised of one or more memory locations configured to store said one or more applications;
    one or more central processing units (CPUs) operatively connected to said computer system memory and configured to execute said one or more applications on a host with a host operating system;
    an isolated environment including application files and executables;
    an interception layer configured to intercept user-space access to said host operating system resources and user-space access to said host operating system interfaces; and
    an interception database configured to maintain mappings between the operating system resources as requested by the one or more applications when running inside the isolated environment and the corresponding host operating system resources outside the isolated environment,
    wherein the mappings in said interception database are created during installation and running of said one or more applications;
    wherein the isolated environments are saved on at least one of a local and remote storage;
    wherein the isolated environment is prepared for network deployment by creating a copy of said isolated environment on the remote storage and delivering the copy of said isolated environment over a network, wherein said copy is created after the host operating system has booted;
    wherein the one or more applications within the isolated environment are run remotely over the network and changes to the isolated environment are stored on a remote environment.

2. The computer system according to claim 1, wherein the isolated environment is deployed on a node by copying the isolated environment from the at least one of the local and remote storage to the node; and wherein said isolate environment is deployed without use of Input/Output (I/O) virtualization.

3. The computer system according to claim 1, wherein the one or more applications within an isolated environment can be deployed on a node without requiring any application installation or configuration; and wherein said isolated environment is deployed without use of Input/Output (I/O) virtualization.

4. The computer system according to claim 1, wherein the one or more applications within the isolated environment are run remotely over a network and changes to the isolated environment are stored locally; and wherein the one or more applications within the isolated environment are run remotely over a network without using Input/Output (I/O) virtualization.

5. The computer system according to claim 1, wherein the isolated environment is stored to persistent storage and transmitted to a remote location.

6. The computer system according to claim 5, wherein the remote location uses the isolated environment to run the one or more applications without requiring any installations.

7. The computer system according to claim 5, wherein the remote location loads the isolated environment and runs the applications in response to a disaster recovery.

8. A method for providing application isolation to one or more applications executing on a host with host operating system, the method comprising:
    executing said one or more applications on a host with a host operating system;
    providing an isolated environment including application files and executables;
    intercepting user-space access to said host operating system resources and user-space access to said host operating system interfaces;
    maintaining database mappings between the operating system resources as requested by the one or more applications when running inside an isolated environment and the corresponding host operating system resources outside the isolated environment, wherein said mappings are created during installation and running of said one or more applications; and
    saving the isolated environments on at least one of a local and remote storage;
    preparing the isolated environment for network deployment by creating a copy said isolated environment on the remote storage and delivering the copy of said isolated environment over a network; wherein said copy is created after the host operating system has booted;
    remotely running the one or more applications within the isolated environment over the network and storing changes to the isolated environment on a remote environment.

9. The method according to claim 8, further comprising deploying the isolated environment on a node by copying the isolated environment from the at least one of the local and remote storage to the node after the host operating system has booted without using Input/Output (I/O) virtualization.

10. The method according to claim 8, further comprising deploying the one or more applications within an isolated environment on a node without requiring any application installation or configuration without using Input/Output (I/O) virtualization.

11. The method according to claim 8, further comprising remotely running the one or more applications within the isolated environment over a network and locally storing changes to the isolated environment without using Input/Output (I/O) virtualization.

12. The method according to claim 8, further comprising remotely running the one or more applications within the isolated environment over the network and storing all changes to the isolated environment on a remote environment.

13. A non-transitory computer readable storage medium for providing application isolation to one or more applications executing on a host with a host operating system, the computer readable medium including instructions executable by a computer, the instructions for:

executing said one or more applications on a host with a host operating system;

providing an isolated environment including application files and executables;

intercepting user-space access to said host operating system resources and user-space access to said host operating system interfaces;

maintaining database mappings between the operating system resources as requested by the one or more applications when running inside an isolated environment and the corresponding host operating system resources outside the isolated environment, wherein said mappings are created during installation and running of said one or more applications; and saving the isolated environments on at least one of a local and remote storage;

preparing the isolated environment for network deployment by creating a copy said isolated environment on the remote storage and delivering the copy of said isolated environment over a network; wherein said copy is created after the host operating system has booted;

remotely running the one or more applications within the isolated environment over the network and storing changes to the isolated environment on a remote environment.

14. The non-transitory computer readable storage medium according to claim 13, wherein the instructions are further for deploying the isolated environment on a node by copying the isolated environment from the at least one of the local and remote storage to the node after the host operating system has booted without the use of Input/Output (I/O) virtualization.

15. The non-transitory computer readable storage medium according to claim 13, wherein the instructions are further for deploying the one or more applications within an isolated environment on a node without requiring any application installation or configuration without the use of Input/Output (I/O) virtualization.

16. The non-transitory computer readable storage medium according to claim 13, wherein the instructions are further for preparing the isolated environment for network deployment by creating a copy on the remote storage and delivering the copy over a network without the use of Input/Output (I/O) virtualization.

* * * * *